(12) United States Patent
Bagepalli et al.

(10) Patent No.: US 7,913,529 B2
(45) Date of Patent: Mar. 29, 2011

(54) CENTRALIZED TCP TERMINATION WITH MULTI-SERVICE CHAINING

(75) Inventors: Nagaraj Bagepalli, San Jose, CA (US);
Prashant Gandhi, San Jose, CA (US);
Abhijit Patra, San Jose, CA (US); Kirti Prabhu, San Jose, CA (US); Anant Thakar, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 383 days.

(21) Appl. No.: 12/101,860

(22) Filed: Apr. 11, 2008

(65) Prior Publication Data
US 2009/0063688 A1    Mar. 5, 2009

Related U.S. Application Data

(60) Provisional application No. 60/966,649, filed on Aug. 28, 2007.

(51) Int. Cl.
*G06F 15/173* (2006.01)
(52) U.S. Cl. .......... 70/223; 709/203; 709/217; 709/224; 370/352; 370/389; 370/401
(58) Field of Classification Search ................ 709/223, 709/224, 203, 217, 219; 370/389, 352, 401
See application file for complete search history.

(56) References Cited

U.S. PATENT DOCUMENTS

| 6,205,480 B1 | 3/2001 | Broadhurst et al. |
| 6,460,141 B1 | 10/2002 | Olden |
| 6,594,712 B1 | 7/2003 | Pettey et al. |
| 6,658,469 B1 | 12/2003 | Massa et al. |
| 6,675,200 B1 | 1/2004 | Cheriton et al. |
| 6,728,884 B1 | 4/2004 | Lim |
| 6,754,829 B1 | 6/2004 | Butt et al. |
| 6,804,720 B1 | 10/2004 | Vilander et al. |
| 6,889,294 B1 | 5/2005 | Nichols et al. |
| 6,901,491 B2 | 5/2005 | Kohn et al. |
| 6,912,604 B1 | 6/2005 | Tzeng et al. |

(Continued)

FOREIGN PATENT DOCUMENTS
WO    WO 03/104943 A2    12/2003

(Continued)

OTHER PUBLICATIONS

International Search Report and Written Opinion mailed Feb. 2, 2009, for International Application No. PCT/US08/10080, 10 pages.

*Primary Examiner* — Lashonda T Jacobs

(57) ABSTRACT

A network element having centralized TCP termination with multi-service chaining is described herein. According to one embodiment, a network element includes a switch fabric, a first service module coupled to the switch fabric, and a second and a third service modules coupled to the first service module over the switch fabric. In response to packets of a network transaction received from a client over a first network for access a server of a data center having multiple servers over a second network, the first service module is configured to terminate a TCP connection of the packets. The TCP terminated packets are transmitted to the second and third service modules over the switch fabric. The second and third service modules are configured to perform different application network services on the TCP terminated packets without having to perform a TCP process again. Other methods and apparatuses are also described.

24 Claims, 13 Drawing Sheets

U.S. PATENT DOCUMENTS

| | | |
|---|---|---|
| 6,922,724 B1 | 7/2005 | Freeman et al. |
| 6,986,040 B1 | 1/2006 | Kramer et al. |
| 6,999,462 B1 | 2/2006 | Acharya |
| 7,010,807 B1 | 3/2006 | Yanovsky |
| 7,051,126 B1 | 5/2006 | Franklin |
| 7,088,727 B1 | 8/2006 | Short et al. |
| 7,100,200 B2 | 8/2006 | Pope et al. |
| 7,114,096 B2 | 9/2006 | Freimuth et al. |
| 7,114,180 B1 | 9/2006 | DeCaprio |
| 7,117,526 B1 | 10/2006 | Short |
| 7,146,635 B2 | 12/2006 | Eggebraaten et al. |
| 7,149,808 B2 | 12/2006 | Lu |
| 7,149,817 B2 | 12/2006 | Pettey |
| 7,149,819 B2 | 12/2006 | Pettey |
| 7,149,892 B2 | 12/2006 | Freed et al. |
| 7,171,681 B1 | 1/2007 | Duncan et al. |
| 7,177,277 B2 * | 2/2007 | Koponen et al. ............ 370/235 |
| 7,178,163 B2 | 2/2007 | Reeves, Jr. |
| 7,184,445 B2 * | 2/2007 | Gupta et al. ................ 370/420 |
| 7,185,192 B1 | 2/2007 | Kahn |
| 7,185,361 B1 | 2/2007 | Ashoff et al. |
| 7,185,364 B2 | 2/2007 | Knouse et al. |
| 7,194,554 B1 | 3/2007 | Short et al. |
| 7,197,556 B1 | 3/2007 | Short et al. |
| 7,209,478 B2 | 4/2007 | Rojas et al. |
| 7,209,970 B1 | 4/2007 | Everson et al. |
| 7,209,977 B2 * | 4/2007 | Acharya et al. ............. 709/240 |
| 7,216,152 B2 | 5/2007 | Short et al. |
| 7,216,225 B2 | 5/2007 | Haviv et al. |
| 7,225,364 B2 | 5/2007 | Carnevale et al. |
| 7,228,412 B2 | 6/2007 | Freed et al. |
| 7,308,101 B2 | 12/2007 | Wing |
| 7,633,955 B1 * | 12/2009 | Saraiya et al. .............. 370/401 |
| 7,664,110 B1 * | 2/2010 | Lovett et al. ................. 370/392 |
| 2002/0107971 A1 * | 8/2002 | Bailey et al. ................. 709/231 |
| 2002/0129271 A1 | 9/2002 | Stanaway, Jr. et al. |
| 2002/0199006 A1 | 12/2002 | Magnussen et al. |
| 2003/0005073 A1 | 1/2003 | Yoshizawa et al. |
| 2003/0014544 A1 * | 1/2003 | Pettey ........................... 709/249 |
| 2003/0043794 A1 | 3/2003 | Cayton et al. |
| 2003/0097454 A1 | 5/2003 | Yamakawa et al. |
| 2003/0097518 A1 | 5/2003 | Kohn et al. |
| 2004/0010545 A1 | 1/2004 | Pandya |
| 2004/0010612 A1 | 1/2004 | Pandya |
| 2004/0030757 A1 | 2/2004 | Pandya |
| 2004/0030770 A1 | 2/2004 | Pandya |
| 2004/0030806 A1 | 2/2004 | Pandya |
| 2004/0037299 A1 | 2/2004 | Pandya |
| 2004/0037319 A1 | 2/2004 | Pandya |
| 2004/0128538 A1 | 7/2004 | Gmuender et al. |
| 2004/0139319 A1 | 7/2004 | Favazza et al. |
| 2004/0165588 A1 | 8/2004 | Pandya |
| 2004/0210320 A1 | 10/2004 | Pandya |
| 2004/0213284 A1 | 10/2004 | Clarke et al. |
| 2005/0076166 A1 | 4/2005 | Shearer |
| 2005/0108518 A1 | 5/2005 | Pandya |
| 2005/0147039 A1 | 7/2005 | Biran et al. |
| 2005/0188212 A1 | 8/2005 | Laferriere et al. |
| 2005/0238035 A1 | 10/2005 | Riley |
| 2005/0286513 A1 | 12/2005 | King |
| 2006/0045099 A1 | 3/2006 | Chang et al. |
| 2006/0047771 A1 | 3/2006 | Blackmore et al. |
| 2006/0067346 A1 | 3/2006 | Tucker et al. |
| 2006/0069668 A1 | 3/2006 | Braddy et al. |
| 2006/0070131 A1 | 3/2006 | Braddy et al. |
| 2006/0074837 A1 | 4/2006 | Braddy et al. |
| 2006/0075057 A1 | 4/2006 | Gildea et al. |
| 2006/0075114 A1 | 4/2006 | Panasyuk et al. |
| 2006/0075463 A1 | 4/2006 | Braddy et al. |
| 2006/0077989 A1 * | 4/2006 | Lu et al. ..................... 370/401 |
| 2006/0087989 A1 | 4/2006 | Gai et al. |
| 2006/0095334 A1 | 5/2006 | Simmons |
| 2006/0101225 A1 | 5/2006 | Aloni et al. |
| 2006/0123481 A1 | 6/2006 | Bhatnagar et al. |
| 2006/0136570 A1 | 6/2006 | Pandya |
| 2006/0168274 A1 | 7/2006 | Alone et al. |
| 2006/0174104 A1 | 8/2006 | Crichton et al. |
| 2006/0200477 A1 | 9/2006 | Barrenechea |
| 2006/0230119 A1 | 10/2006 | Hausauer et al. |
| 2006/0233101 A1 | 10/2006 | Luft et al. |
| 2006/0236063 A1 | 10/2006 | Hausauer et al. |
| 2006/0236385 A1 | 10/2006 | Innes et al. |
| 2006/0259661 A1 | 11/2006 | Feng et al. |
| 2006/0262782 A1 | 11/2006 | Biran et al. |
| 2006/0262796 A1 | 11/2006 | Biran et al. |
| 2006/0262797 A1 | 11/2006 | Biran et al. |
| 2006/0262799 A1 | 11/2006 | Biran et al. |
| 2006/0268866 A1 | 11/2006 | Lok |
| 2006/0291803 A1 | 12/2006 | Watson et al. |
| 2007/0002769 A1 | 1/2007 | Matityahu et al. |
| 2007/0005801 A1 | 1/2007 | Kumar et al. |
| 2007/0067638 A1 | 3/2007 | Haibl et al. |
| 2007/0073966 A1 | 3/2007 | Corbin |
| 2007/0121615 A1 | 5/2007 | Weill et al. |
| 2007/0130167 A1 | 6/2007 | Day et al. |
| 2007/0153798 A1 | 7/2007 | Krstulich |
| 2007/0160072 A1 | 7/2007 | Thalanany et al. |
| 2007/0160073 A1 | 7/2007 | Toumura et al. |
| 2007/0165672 A1 | 7/2007 | Keels et al. |
| 2007/0171921 A1 | 7/2007 | Wookey et al. |
| 2007/0174429 A1 | 7/2007 | Mazzaferri et al. |
| 2007/0179955 A1 | 8/2007 | Croft et al. |
| 2007/0180088 A1 | 8/2007 | Zhao |
| 2007/0180447 A1 | 8/2007 | Mazzaferri et al. |
| 2007/0180493 A1 | 8/2007 | Croft et al. |
| 2007/0226750 A1 * | 9/2007 | Sharp et al. ................. 719/313 |

FOREIGN PATENT DOCUMENTS

| | | |
|---|---|---|
| WO | WO 2005/081855 A2 | 9/2005 |
| WO | WO 2005/104443 A2 | 11/2005 |
| WO | WO 2006/031496 A2 | 3/2006 |
| WO | WO 2006/113722 A2 | 10/2006 |

* cited by examiner

CENTRALIZED TCP TERMINATION WITH MULTI-SERVICE CHAINING

RELATED APPLICATIONS

This application claims the benefit of U.S. Provisional Patent Application No. 60/966,649, filed Aug. 28, 2007, which is incorporated by reference herein in its entirety.

FIELD OF THE INVENTION

The present invention relates generally to application service appliances. More particularly, this invention relates to application service appliances having centralized TCP termination for multi-service chaining.

BACKGROUND

The ability to connect information technology infrastructure reliably, cost-effectively and securely is of high importance for today's global enterprises. To communicate with customers, clients, business partners, employees, etc., the Internet has proven to be more appropriate compared to private communication networks. However, communication via the Internet, which typically uses TCP/IP (Transmission Control Protocol/Internet Protocol), also increases the requirements for data security. Network firewalls are one of the many examples of solutions for network security.

Enterprise Web Application Services build an important foundation for such client, customer, and employee communication. A very common configuration for hosting such enterprise web Application Services is shown in FIG. 1. As shown in FIG. 1, an enterprise can offer web Application Services to various clients and there are several possibilities for clients to connect to the servers depending on the location of the client relative to the servers' location. The servers which provide the Application Services are typically located in the enterprise's data center 1016 and are accessible, directly or indirectly, via World-Wide-Web (WWW) servers 1012. Sometimes enterprises provide access to the Application Services by making the application servers directly accessible by putting those application servers into a Demilitarized Zone (DMZ) 1011.

A client 1003 may connect via a Local Area Network (LAN) through the enterprise's intranet 1013. Another client 1004 may connect through a Wireless LAN (WLAN) to the intranet 1013. Yet another client 1005 may be located inside the enterprise's campus network 1015, which connects to the enterprise's intranet 1013. An enterprise may have zero or more campuses 1014 and 1015. Yet another client 1001 may connect through the Internet 1000, or a client 1002 may have a mobile connection to the Internet 1000. In any case to prevent illegitimate access to the enterprise's web Application Services, the "inside" of the enterprise's network, the intranet 1013, is protected by having a network perimeter 1010, which may comprise firewalls, associated network interconnect, and additional resources "within" the perimeter network configured so as to be broadly accessible to users on the "outside" of the enterprise.

Behind the perimeter 1010, access is granted to legitimate client requests only, while illegitimate access is rejected. The fundamentals in determining whether an access request is legitimate or not are based on the network reference model from the International Organization for Standardization (ISO). This ISO network reference model classifies Network Services into seven layers.

Traditional security products generally assume the existence of a trusted intranet—locations where enterprises control their own LANs, switches and routers—which can be organized into or placed within some type of security perimeter, to protect its resources from the un-trusted Internet. However, in today's business environment, enterprises no longer enjoy the same level of trust and control of their intranets, as enterprises increasingly rely on contractors, partners, consultants, vendors, and visitors on-site for daily operation. As a result, enterprises are exposing internal resources to this wide set of clients whose roles are also frequently changing. Thus, the network trust boundary, delineating inside and outside clients, is disappearing—a phenomenon referred to as "de-perimeterization". In such an environment, protection of an enterprise's resources—such as its intellectual property, as well as mission-critical and operational systems—becomes of critical importance. Also, most security exploits easily traverse perimeter security, as enterprises typically let through email, web and any encrypted network traffic, such as Secure Sockets Layer (SSL), Simple Mail Transfer Protocol (SMTP) with Transport Layer Security (TLS), and authenticated Virtual Private Network (VPN) traffic, for example via IP Security (IPSec). Traditional perimeter security approaches, for example firewalls, intrusion detection systems and intrusion prevention systems have little or no benefit at the perimeter in providing access control functions to the resources. They have become more attack mitigation mechanisms than access control mechanisms. Enterprises are coming to terms with the fact that a hardened perimeter strategy is un-sustainable.

Traditional firewall or router access control lists cannot protect application resources from unauthorized access because network parameters such as Internet Protocol (IP) addresses and IP port numbers no longer deterministically identify resources, nor identify users, clients, or applications accessing these resources. Network firewall technology was invented when enterprises had a limited set of applications such as Telnet, File Transfer Protocol (FTP), and Email, and its primary functions were to limit access to specific applications from the outside and to limit access by systems within the enterprise to specific applications outside the firewall. Network layer parameters such as source, destination IP address and TCP or UDP port numbers were sufficient to identify the client and the operations the clients intended to perform on a particular resource. However, with the proliferation of mobile devices and tunneled applications, the network layer parameters are no longer useful to identify the client, the resource accessed, and the operation. Firewalls have evolved over the time, embracing functions such as deep packet inspection and intrusion detection/prevention, to handle application-level attacks, but the core access control function remains the same.

In effect, de-perimeterization demands that access control functions are positioned close to application resources and that a micro-perimeter is established in the heart of the data center by placing an identity-based policy enforcement point in front of any application resource. Enterprise business drivers for such an enforcement point are the need for rich and uniform protection of resources, business agility via attribute-based, policy-driven provisioning, and regulatory compliance. Traditional server-centric authorization solutions providing role-based authorization often require custom code development, extensive cross-vendor testing whenever there is a version change (of the underlying operating system, agent or application), and are costly and difficult to maintain because of their proprietary nature. Also, traditional server-based network appliances—primarily focused on low-bandwidth ISO Layer-4 to ISO Layer-7 perimeter services—are unsuitable for data center deployment, both in functional richness and in ISO Layer-7 performance.

Providing multiple ISO Layer-4 to ISO Layer-7 services (such as SSL acceleration, application acceleration, or application firewall, etc.) degrades the performance to a large extent because, in today's approaches, multiple transport protocol terminations happen at each of the cascaded Network Service points. These multiple TCP or multiple SSL terminations, for example, add-up to the overall latency and make the entire setup hard to administer. This problem exists regardless of whether multiple server-based network appliances are chained (each providing a different ISO Layer-4 to ISO Layer-7 service), or whether a single network appliance using a packet based switch architecture with multiple modules (one for each different ISO Layer-4 to ISO Layer-7 service) is used.

SUMMARY OF THE DESCRIPTION

A network element having centralized TCP termination with multi-service chaining is described herein. According to one embodiment, a network element includes a switch fabric, a first service module coupled to the switch fabric, and a second and a third service modules coupled to the first service module over the switch fabric. In response to packets of a network transaction received from a client over a first network for access a server of a data center having multiple servers over a second network, the first service module is configured to terminate a TCP connection of the packets. The TCP terminated packets are transmitted to the second and third service modules over the switch fabric. The second and third service modules are configured to perform different application network services on the TCP terminated packets without having to perform a TCP process again.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

One aspect of the invention is the use of a Lossless Data Transport Fabric for Layer-7 Networking, comprising an ISO Layer-7 networking system, which performs network operations in multiple separate processing domains, which are interconnected via the Lossless Data Transport Fabric (LDTF). This LDTF may be an RDMA-capable fabric, such as InfiniBand or iWARP.

One aspect of the invention is a system and method for Highly-Scalable Layer-7 Networking, comprising an ISO Layer-7 networking system with multiple processing elements connected via a Lossless Data Transport Fabric where the processing necessary to perform the network operation(s) are distributed over the processing elements. In some configurations, at least one of the processing elements is dedicated to operations for ISO Layer-7 processing. In some configurations, at least one of the processing elements is dedicated to operations for ISO Layer-2 to ISO Layer-5 processing.

Overview

Figure 2:
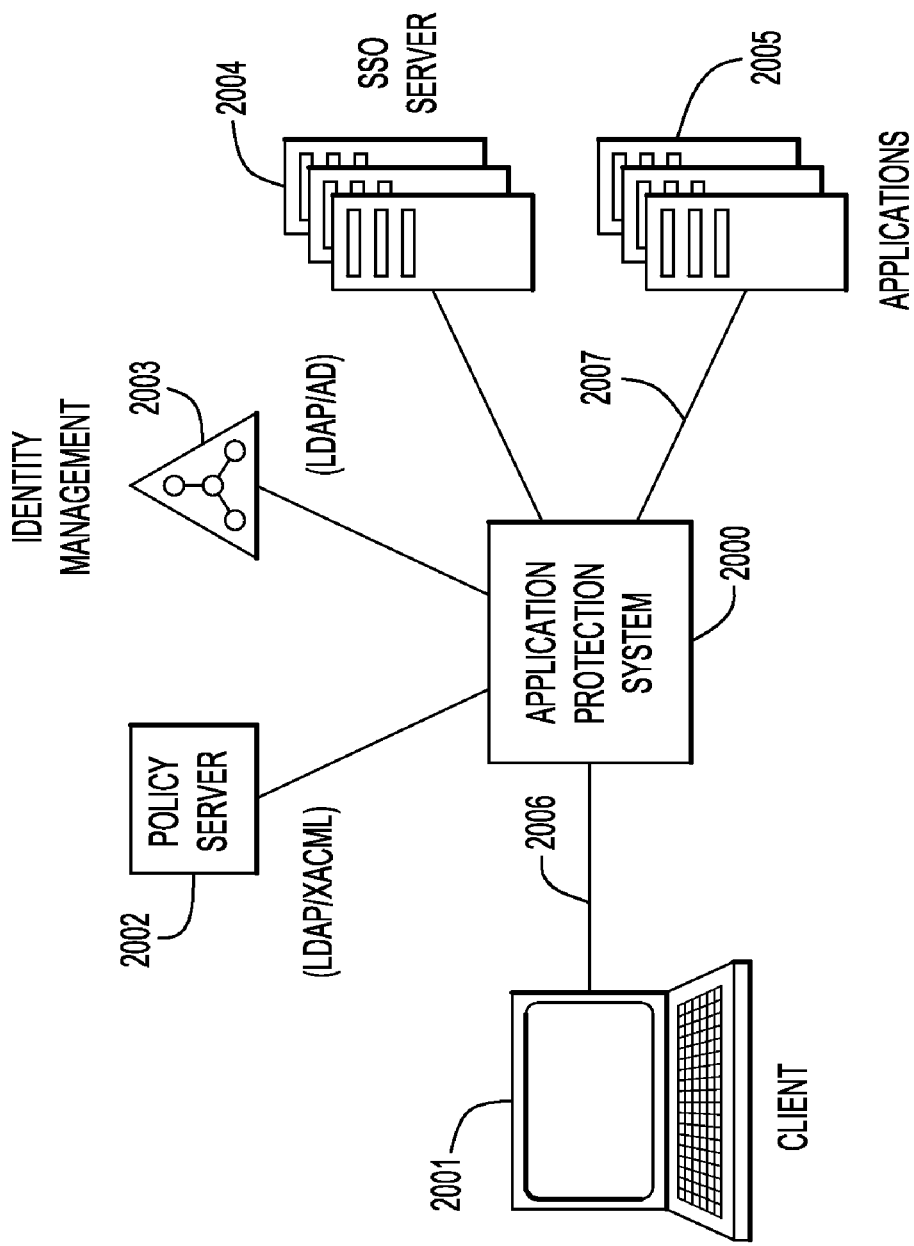
FIG. 2 illustrates the application of an application network appliance (ANA) as the APS according to one embodiment of the invention.

The approach described herein applies combinations of parallel, multi-processor computing technology with lossless, low-latency, high-bandwidth network fabric technology (also known as Lossless Data Transport Fabric, or LDTF) to form novel methods and systems for high performance, high-reliability, high availability, and secure network applications. The various embodiments of the inventions described herein enable the implementation of highly reliable, highly scalable solutions for enterprise networking such as, for example, the APS 2000 from FIG. 2.

Multiple network Services are efficiently provided by terminating transport protocols centrally. As can be seen, any transport protocol can be terminated centrally, each PDU's payload can be collected and converted into a data stream and, vice versa, a data stream can be converted into PDUs for any transport protocol and be transported via the given transport protocol. A simple concatenation of the PDU payload into a byte-stream is not sufficient. Key to the conversion is that state information must be maintained about the meta-data of each connection. Such meta-data includes the session information, for example via a unique connection identification number, the transaction information, as well as the information regarding segments and packets. Finite state machines can be used to track the meta-data.

Transport protocols are protocols which are used to transport information via networks. These include, obviously, the ISO Layer-3 protocols such as IPv4, IPv6, IPSec, the ISO Layer-4 protocols such as TCP, UDP, SCTP, the various ISO Layer-5 protocols such as FTP, HTTP, IMAP, SMTP, GTP, L2TP, PPTP, SOAP, SDP, RTSP, RTP, RTCP, RPC, SSH, TLS, DTLS, SSL, IPSec, and VPN protocols. However, other protocols and approaches are contemplated within the scope of the inventions, which serve as transport mechanisms for transmitting information and application data and can also be terminated in a centralized fashion by a protocol proxy and the corresponding PDUs can be transformed into a data stream for application layer processing. Examples of such are, CSIv2, CORBA, IIOP, DCOM and other Object Request Brokers (ORB), MPEG-TS or RTP as a transport for multi-media information, RTSP or SIP as another transport for multi-media information, peer-to-peer transport mechanisms, transport mechanisms based on J2EE such as Java RMI, streaming media protocols such as VoIP, IPTV, etc.

For the sake of simplicity we will use the term Centralized Transport Protocol Termination throughout the rest of the description, however, this is for exemplary purposes only and is not intended to be limiting. Centralized Transport Protocol Termination can be performed by dedicated processing units, and different ISO Layer-7 services can be performed in other dedicated processing units. The use of a lossless low-latency high-bandwidth fabric for inter-process communication between such dedicated processing units makes it possible to simultaneously support Centralized Transport Protocol Termination for multiple services. For example, TCP can be terminated once, transformed into a data stream and this data stream is transported from one dedicated processing unit to another using the lossless low-latency high-bandwidth fabric. The low-latency nature of the fabric helps to reduce the overall latency in client-to-server transactions.

Figure 1:
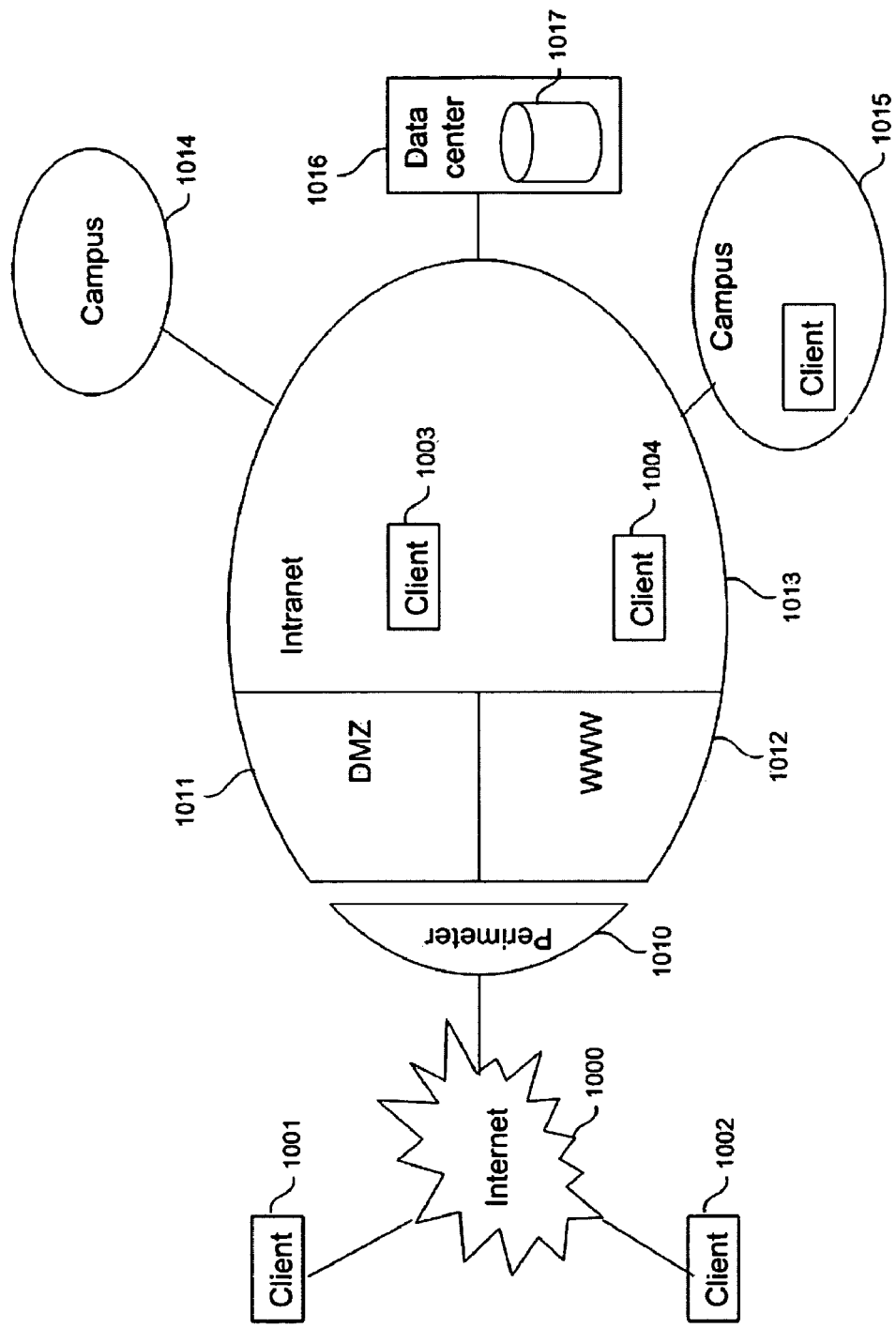
FIG. 1 illustrates a typical corporate computer network connected to the Internet.

In one embodiment, the Application Protection System (APS) 2000 is a network appliance that can act as a proxy between the client 2001 and the application server 2005, and can determine whether a client 2001 shall be granted access to certain applications 2005. In one example, the client 2001 is one or more of the clients 1001, 1002, 1003, 1004, or 1005 of FIG. 1. In another example, the client 2001 can be a virtual machine or a cluster of computers, or a server (for server-to-server connections, for example). The application server 2005 can be, for example, without limitation, one or more file servers, one or more web servers, one or more database servers, one or more compute servers, one or more storage servers or one or more game servers. The decision whether access is granted or rejected involves an Identity Management Server 2003 to identify the user, client, or application, for example using Lightweight Directory Access Protocol (LDAP) or Active Directory (AD), and is the result of querying a Policy Server 2002 to analyze the access policy for the requested application 2005.

The APS 2000 may use a Triangulated Authorization method which, for example, is based on multiple aspects of a client (such as the client 2001), the requested application (such as application 2005) and certain network characteristics: Who—a client (a user or a machine) and its associated attributes such as department, role, project association, seniority, citizenship, etc; Where—network and environment attributes such as access methods (wire-line/wireless/VPN), location (e.g., USA, Switzerland, China) and time; What—on-the-wire session attributes, including protocol and content/resource attributes. The outcome of this Triangulated Authorization method can be used to determine whether access to an application is granted or rejected. Optionally, a Single-Sign-On (SSO) server such as server 2004 may be involved that allows the client 2001 to obtain authorization for accessing multiple applications at once.

Centralized Transport Protocol Termination for Multi-Services

One embodiment of the invention acts as a proxy between one or more clients and one or more application servers to control the access of the one or more clients to the one or more applications. This is described, for example, in FIG. 2, where the APS 2000 controls access of client 2001 to application server 2005. Thereby the approach can act as a high-speed, full proxy which terminates both client-side and server-side transport protocol connections, and which behaves as a virtual server to the one or more clients, and as a virtual client to the one or more servers. The proxy function is required because of the need to reassemble PDUs into data streams and (where needed) to decrypt the payload data for inspection such as access control. The proxy function involves ISO Layer-2 to ISO Layer-5 processing such as Centralized Transport Protocol Termination.

One embodiment of the invention is a network appliance which terminates multiple transport protocols in one central point to overcome the many drawbacks of multiple transport protocol termination, such as increased latency and lack of scalability. Therefore, the network appliance may need to perform a set of functions similar to those typical of application servers such as network proxy, deep packet inspection, cryptography, data compression, regular expression parsing, etc. Network services that may need Centralized Transport Protocol Termination include but are not limited to application authentication and authorization, application firewalls, application data routing, in-line intrusion-detection and intrusion prevention, SSL offloading/acceleration, server load balancing, XML offloading/acceleration, and application front-end engine services (also called application acceleration).

ISO Layer-2 to ISO Layer-5 processing typically involves packets, segments and records processing, whereas ISO Layer-7 processing typically involves application data processing. Full ISO Layer-7 inspection goes beyond application headers and typically involves reassembling application layer data. A general rule used in the art is that a 1 GHz processor is needed for processing ISO Layer-3 or ISO Layer-4 PDUs at 1 Gbps, whereas a 10 GHz processor is needed for application data processing at 1 Gbps (for example for SSL VPN URL mangling operation). Therefore, the computational complexity required for scaling the proxy functionality is quite different from the computational complexity required for scaling ISO Layer-7 processing.

To solve the computational complexity in an efficient way, one embodiment of the invention splits the overall ISO Layer-2 to ISO Layer-7 stack into (at least) two independent processing domains. One domain, which is called Network Service processing for ISO Layer-2 to ISO Layer-5 processing (i.e., up to TCP/SSL processing) provides proxy functions, and a second domain which is called Application Service processing for ISO Layer-7 processing. Splitting the stack requires a reliable, lossless, low-latency, high-bandwidth connection between those two (or more) processing domains in order for the Network Service processing to forward the data stream to the Application Service processing for further processing. As a solution, this approach uses a LDTF such as RDMA-capable fabric technology to provide this reliable lossless, low-latency, high-bandwidth interconnect between processing domains.

Figure 3:
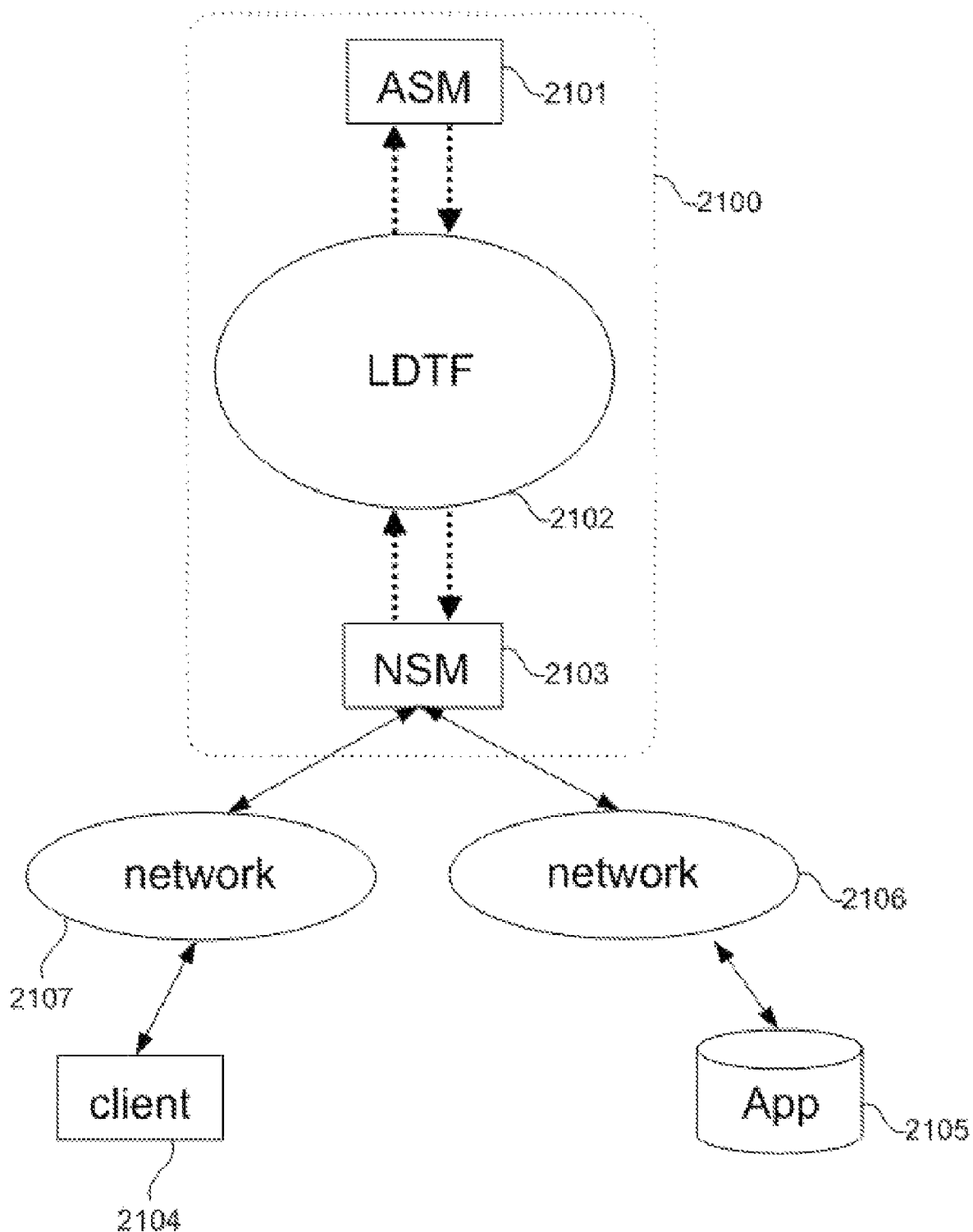
FIG. 3 is a network connected block diagram of an ANA according to one embodiment of the invention.

FIG. 3 is a block diagram illustrating an example of application service appliance system according to one embodiment of the invention. Referring to FIG. 3, ANA 2100 acts as a proxy between a client 2104 and an application server 2105. The client 2104 is connected to the ANA 2100 via a network 2107. Network 2107 can, for example, be a LAN, a WAN, a WLAN, an intranet, or the Internet. The application server 2105 is connected to the ANA 2100 via network 2106. Network 2106 can, for example, be a LAN, a WAN, a WLAN, an intranet, or the Internet. Networks 2106-2107 may be the same network or different networks. While it is apparent that multiple clients and multiple application servers may be connected to the ANA 2100, for the sake of simplicity a single client, single application server case is used as a placeholder throughout. Incoming connections, for example, a request from the client 2104 is terminated in the NSM 2103 and is transformed into a data stream. This is done by PDU processing and reassembling the payload of the PDU into a data stream of ISO Layer-7 application data. This data stream is transported via LDTF 2102 to the ASM 2101 for further ISO Layer-7 processing. LDTF 2102 may be an RDMA or IB compatible fabric. The result of ISO Layer-7 processing done by ASM 2101 is then transported back—still as a data stream—via the LDTF 2102 to the NSM 2103. The NSM 2103 then transforms the data stream into PDUs and sends the PDUs to the application server 2105 via the appropriate transport protocol. Connections which originate from the application server 2105 can be handled similarly.

Using this novel approach, both processing domains can be scaled independent of each other and a well-balanced system can be achieved at reasonable costs.

A LDTF, such as the LDTF 2102 can be used for the inter-process communication between those domains. In one embodiment of the invention, the LDTF is implemented using the IB point-to-point switch fabric architecture. Incoming connections from the client are terminated in the NSM and are transformed into a data stream. This data stream can, for example, without limitation, be transported via the IB fabric. In one other embodiment of the invention, the LDTF is implemented using an RDMA-capable interconnect fabric. In further embodiments of the invention, it is contemplated that other LDTFs may be used as interconnect fabrics, for example, without limitation, iWARP and other interconnect fabrics such as are known or may become known to one of ordinary skill in the art.

This can be done by PDU processing and reassembling the payload of the PDUs into their corresponding data stream. This data stream is transported via IB fabric to the ASM for further ISO Layer-7 processing. The result of ISO Layer-7 processing done by ASM is then transported back—still as a data stream—again via the IB fabric to the NSM. The NSM then transforms the data stream into PDUs and sends the PDUs to the application server using the appropriate transport protocol. Connections which originate from the application server can be handled similarly.

One benefit of the present approach is the overall reduction of latency in the communication link between clients and application servers. Yet another benefit is that the approach can be scaled with various, specialized, dedicated processing modules.

Highly Scalable Architecture for Application-Layer Service Using LDTF

One key aspect of the invention described herein is the approach to keep the communication in separate planes: For example, a Network Service plane, an Application Service plane and a Management Service plane. The fact that the Network Service plane is separate from the Application Service plane is also reflected by splitting the network protocol processing into two or more domains, for example into Network Service processing and Application Service processing. This offers additional options for optimizing the performance of this approach and to make it scale better to networking and availability demands.

One option is that at the Network Service plane a processing unit for packet order work processing can be deployed. Then the packets of a particular connection can be handled by any processing element of a multi-processing architecture without the need for software locks. The packets can then be processed in multiple stages, which provide a higher degree of concurrency. Similarly, at the Application Service plane a processing unit for transaction order work processing can be deployed and, for example, implemented in software. Then the transactions of a particular connection can be handled by any processing element of a multi-processing architecture without the need for software locks. Therefore, each transaction can then be processed in a pipelined fashion which serializes the application data processing and increases the level of concurrency for ISO Layer-7 processing, which again further increases the compute efficiency of this approach.

Figure 4:
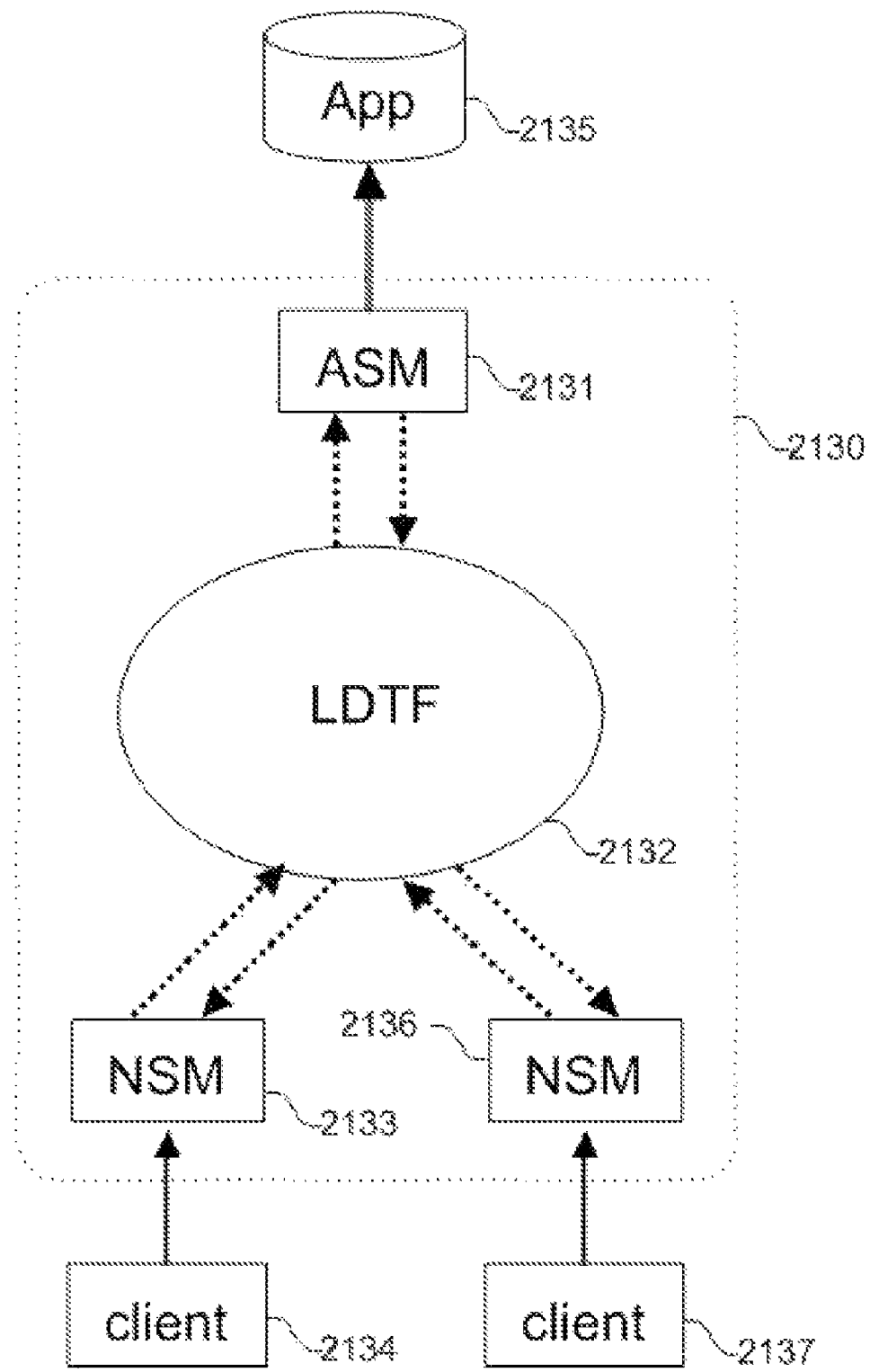
FIG. 4 is a block diagram which illustrates scalability of an ANA according to one embodiment of the invention.

At the Network Service plane various possibilities for network flow control schemes now become possible. FIG. 4 shows how two NSMs can be used to scale the ANA 2130 for an increased bandwidth demand. The NSM 2133 and the NSM 2136 each service client 2134 and client 2137 respectively therefore providing load balancing options. Both NSM 2133 and NSM 2136 reassemble the PDUs to transform the PDU payload into a data stream. Both NSMs are connected to LDTF 2132 to forward the data stream to ASM 2131 for ISO Layer-7 processing before it gets sent to the application server 2135. One advantage of balancing the transport protocol traffic over two—or more—NSMs is to reduce latency in a client-to-server connection, for example, when compute-intensive SSL termination is done by a NSM. While FIG. 4 illustrates the case of dedicated NSMs (one for client 2134 and another NSM for client 2137—somewhat reflecting the case of a segmented network) all the two—or more—NSMs could be connected to all clients as well.

Figure 5:
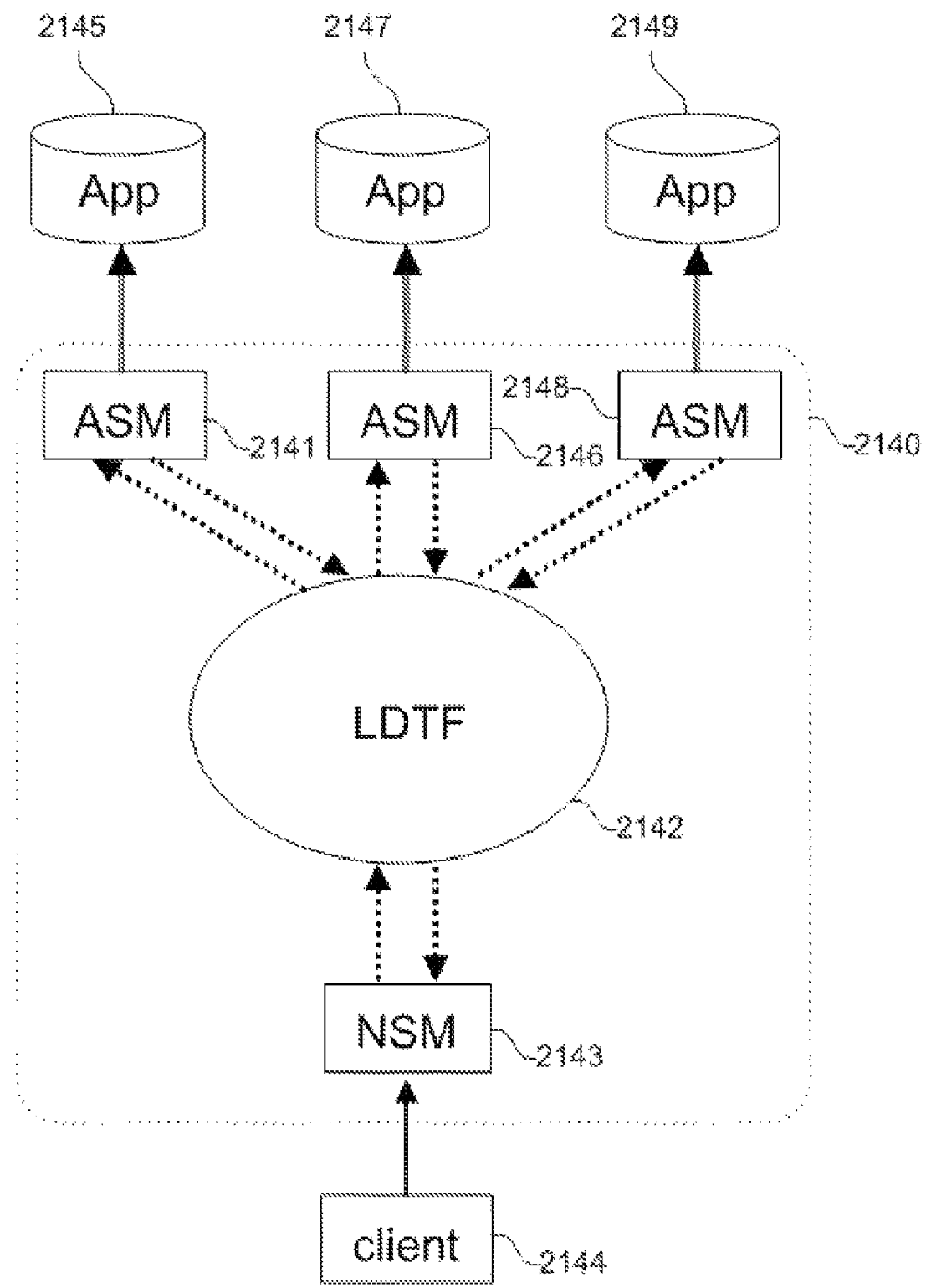
FIG. 5 is a block diagram which illustrates scalability of an ANA according to another embodiment of the invention.

In a practical enterprise network application another performance optimization is important. Typically, one NSM can keep several ASMs busy. Therefore it makes sense not only to load balance traffic in the Network Service plane but also in the Application Service plane. Various possibilities for such optimizations exist as disclosed herein. In one embodiment of the invention, the ANA 2140 of FIG. 5 uses one NSM 2143 for communication with client 2144 and that NSM 2143 forwards the transformed data stream via LDTF 2142 to two or more "parallel" ASMs. In this example, three ASMs 2141, 2146, and 2148 are available, each dedicated to one application server, namely 2145, 2147, and 2149. Load balancing among the two or more ASMs can be done by the NSM and can, for example, depend on which application server provides the Application Service requested by the client.

Figure 6:
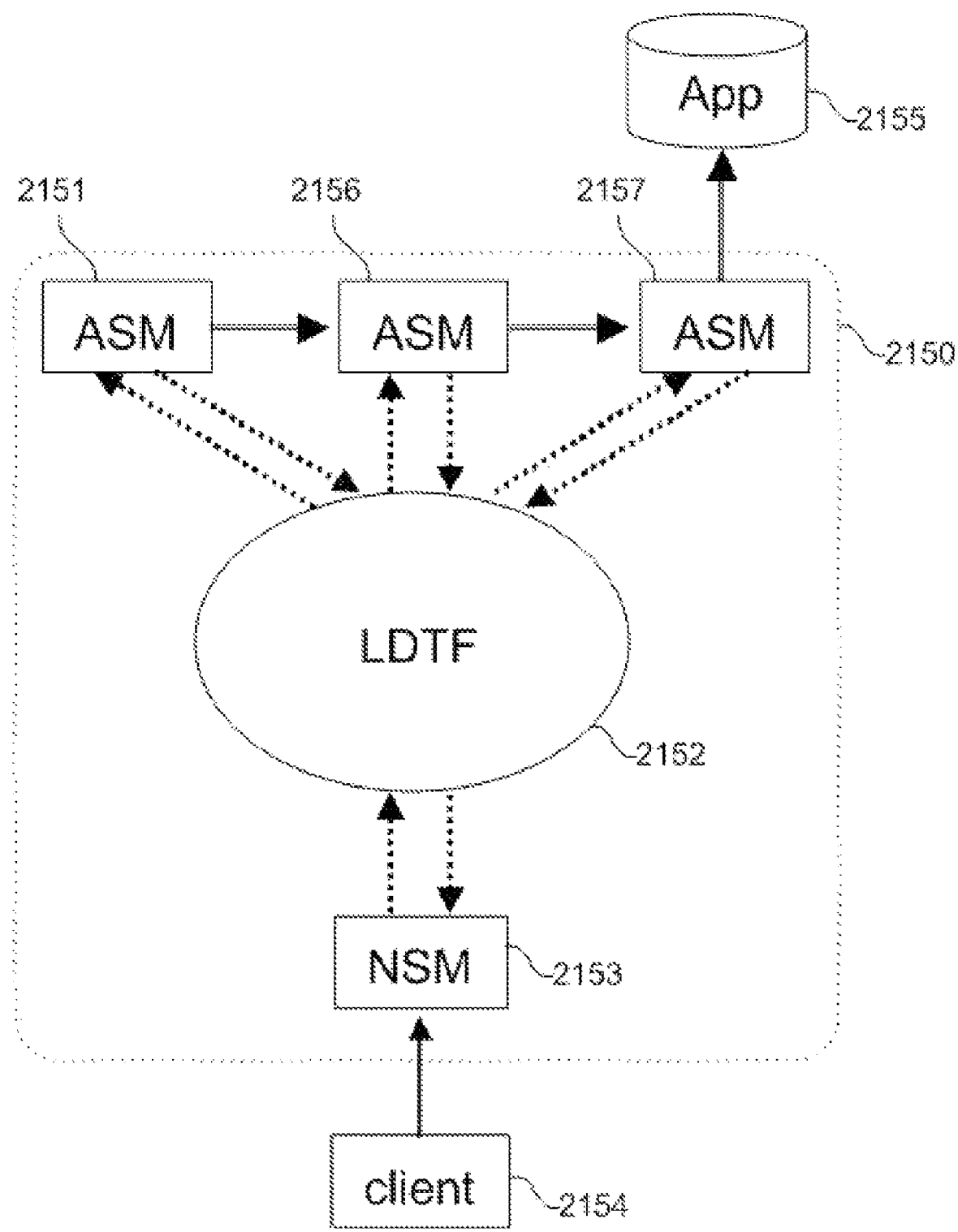
FIG. 6 is a block diagram which illustrates scalability of an ANA according to another embodiment of the invention.

FIG. 6 illustrates another option for scaling by load balancing in the Application Service plane. In another embodiment of the invention, the ANA 2150 uses one NSM 2153 for communication with client 2154 and that NSM 2153 forwards the transformed data stream via LDTF 2152 to two or more ASMs. In this example, three "pipelined" ASMs 2151, 2156, and 2157 are performing ISO Layer-7 processing in a pipelined manner: The ASM 2151 preprocesses the data stream and hands it over to ASM 2156 which performs additional ISO Layer-7 processing before it further hands the data stream over to ASM 2157 which does final ISO Layer-7 processing before the data is handed over to the application server 2155. Pipelined execution may also be done using out-of-order execution. Of course, all ASMs are connected to the LDTF 2152 which is used for efficient inter-process communication between the various ASMs. Thus, in this example, the ASMs build a logical processing chain: NSM 2153 only forwards the data stream to ASM 2151, and ASM 2157 only forwards the data to the application server 2155 via the converged data center fabric.

Figure 7:
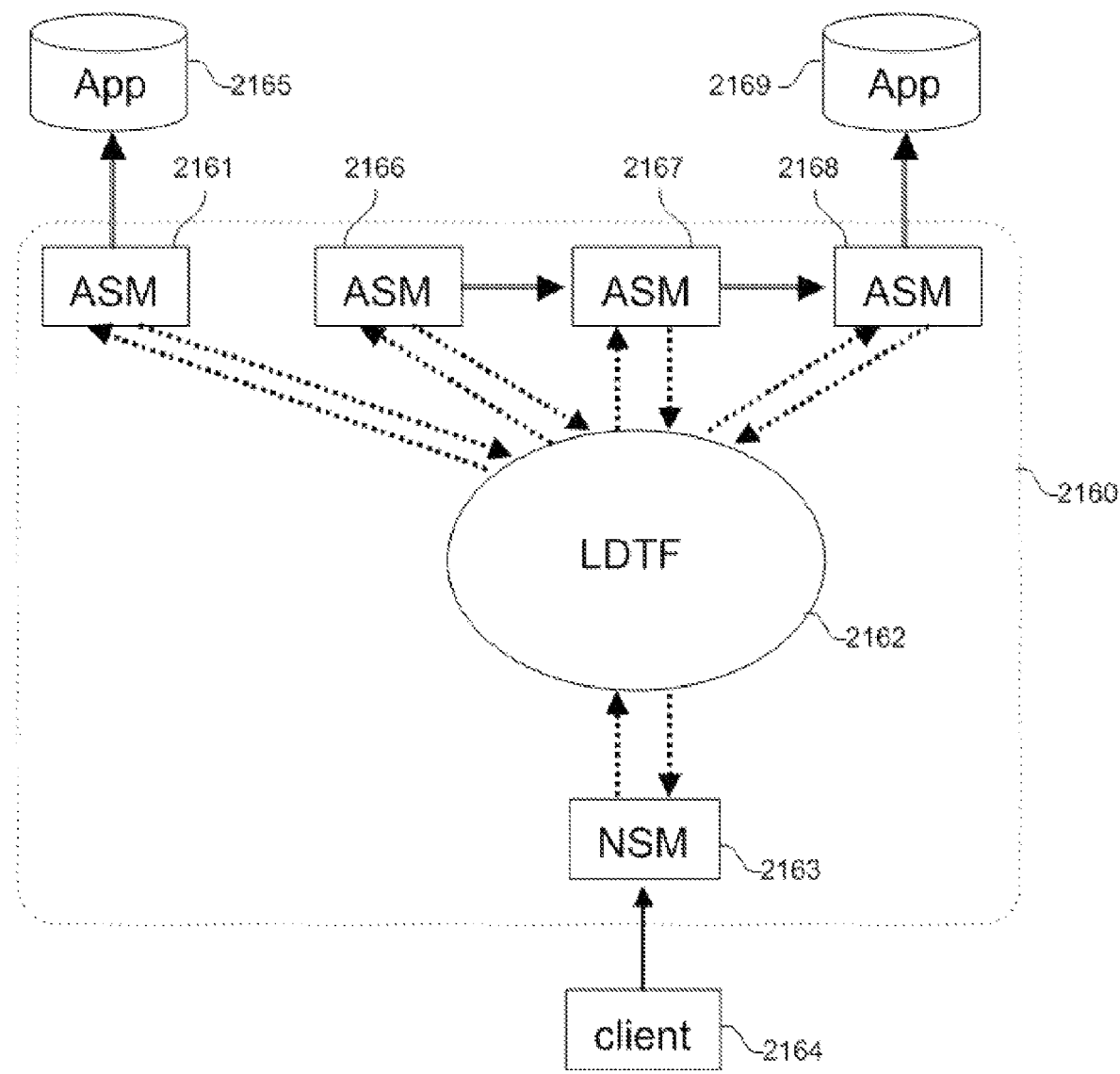
FIG. 7 is a block diagram which illustrates scalability of an ANA according to yet another embodiment of the invention.

Many combinations of scaling by connecting one or more NSMs and one or more ASMs are possible, all interconnected via lossless, low-latency, high-bandwidth LDTF. For example, in yet another embodiment of the invention which is illustrated in FIG. 7, a hybrid combination of "parallel" and "pipelined" ASMs is shown: The ANA 2160 uses one NSM 2163 for communication with client 2164 and that NSM 2163 forwards the transformed data stream via LDTF 2162 to two or more ASMs. One ASM 2161 performs dedicated ISO Layer-7 processing for application server 2165. Parallel to ASM 2161 three other ASMs 2166, 2167, and 2168 are pipelined to perform ISO Layer-7 processing for application server 2169.

L2-L5 Processing Unit—NSM

Figure 8:
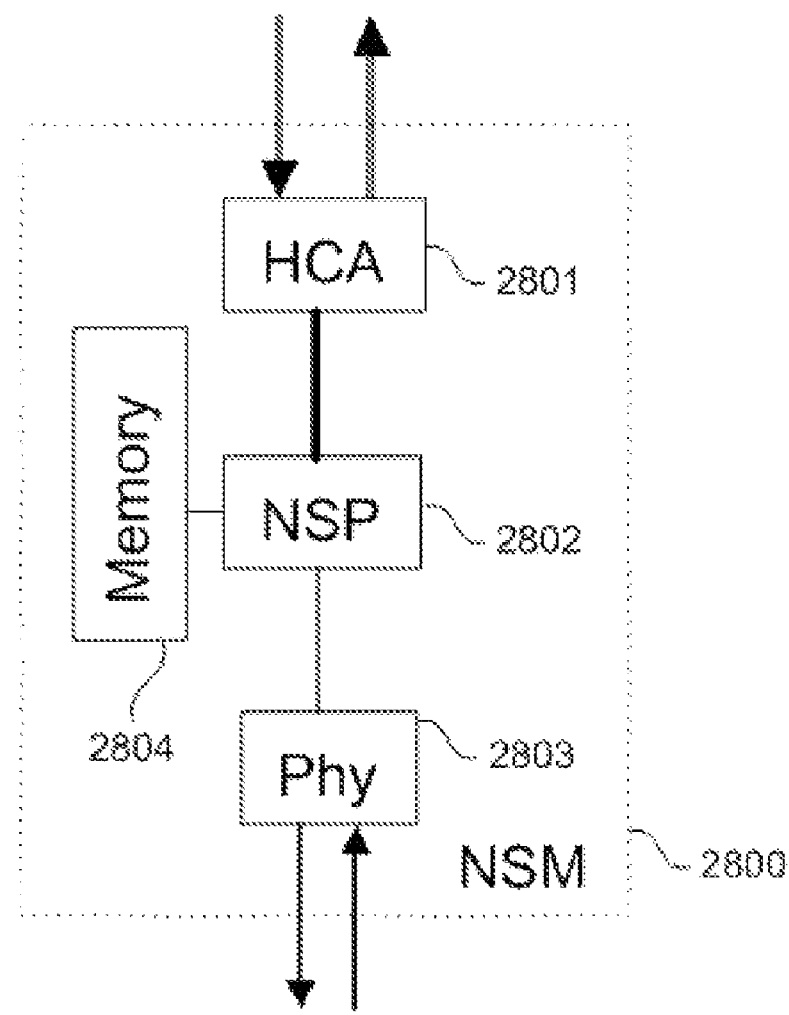
FIG. 8 is a block diagram of a Network Service Module (NSM) of an ANA according to one embodiment of the invention.

A NSM processes the lower network layers, ISO Layer-2 to ISO Layer-5. In one embodiment of the invention, such a NSM can be constructed as shown in FIG. 8. The NSM 2800 comprises a host channel adapter (HCA) 2801, a network services processor (NSP) 2802, and physical network layer receiver (Phy) 2803 and memory 2804. The host channel adapter 2801 connects to the LDTF, which can be IB fabric. The physical network layer receiver 2803 connects to Ethernet. The NSP 2803 runs programs stored in memory 2804 to perform ISO Layer-2 to ISO Layer-5 processing, such as Centralized Transport Protocol Termination, PDU reassembly to transform the PDU payload into a data stream, cryptographic processing, etc.

Figure 9:
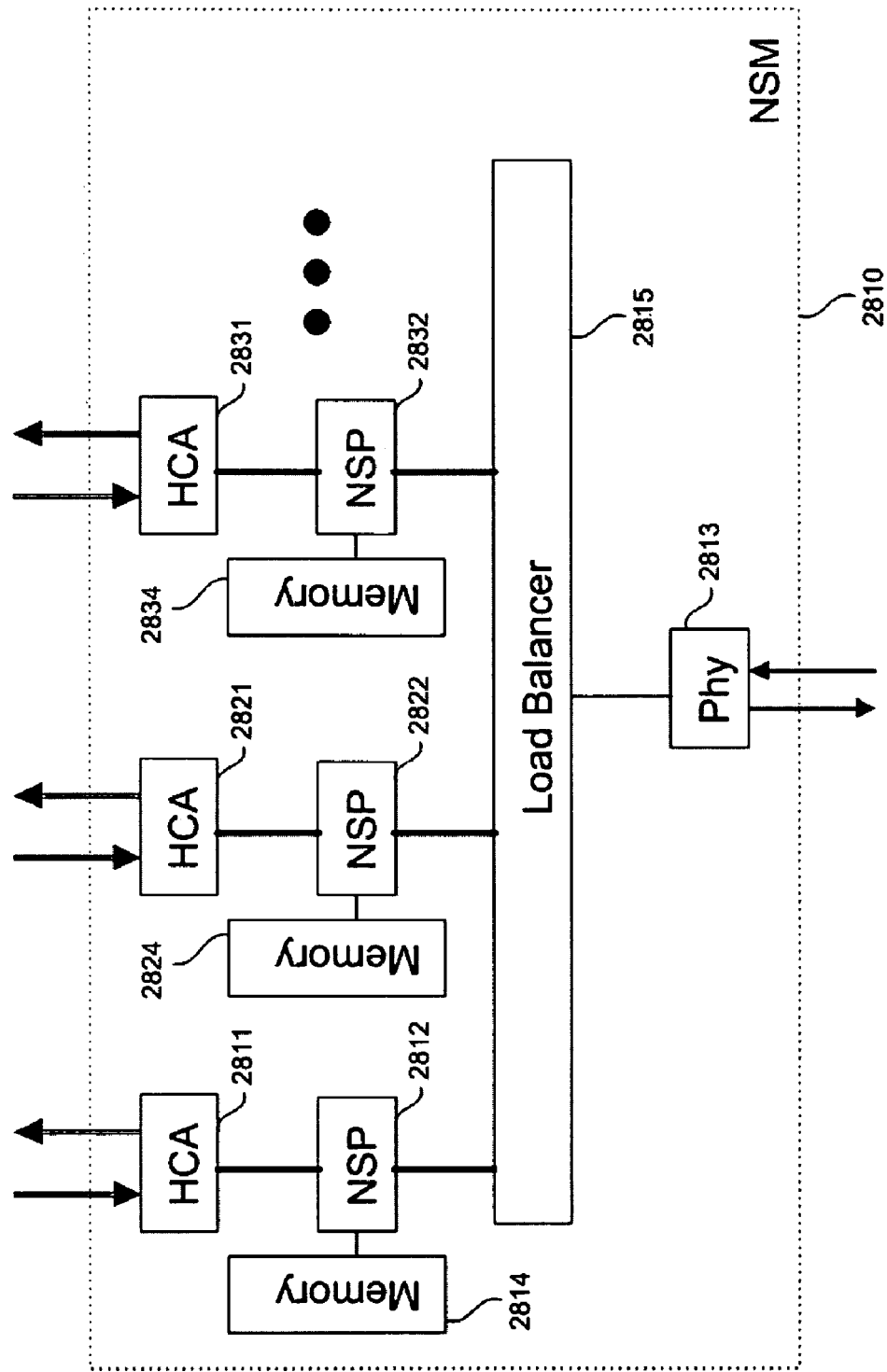
FIG. 9 is a block diagram of a NSM of an ANA according to another embodiment of the invention.

For better scalability, in one embodiment of the invention, a NSM can be a multi-processor architecture, as shown in FIG. 9. Here the NSM 2810 can comprise two—or more—NSPs, such as NSP 2812, NSP 2822, NSP 2832, each having a dedicated host channel adapter, such as host channel adapter 2811, host channel adapter 2821, and host channel adapter 2831, and dedicated memory, such as memory 2814, memory 2824, and memory 2834. A load balancer 2815 is in between the NSPs and the physical network layer receiver 2813 and balances the network load between the two—or more—NSPs. The load balancer 2815 can use common approaches known in the art to balance ingress or egress network traffic.

L7 Processing Unit—ASM

Figure 10:
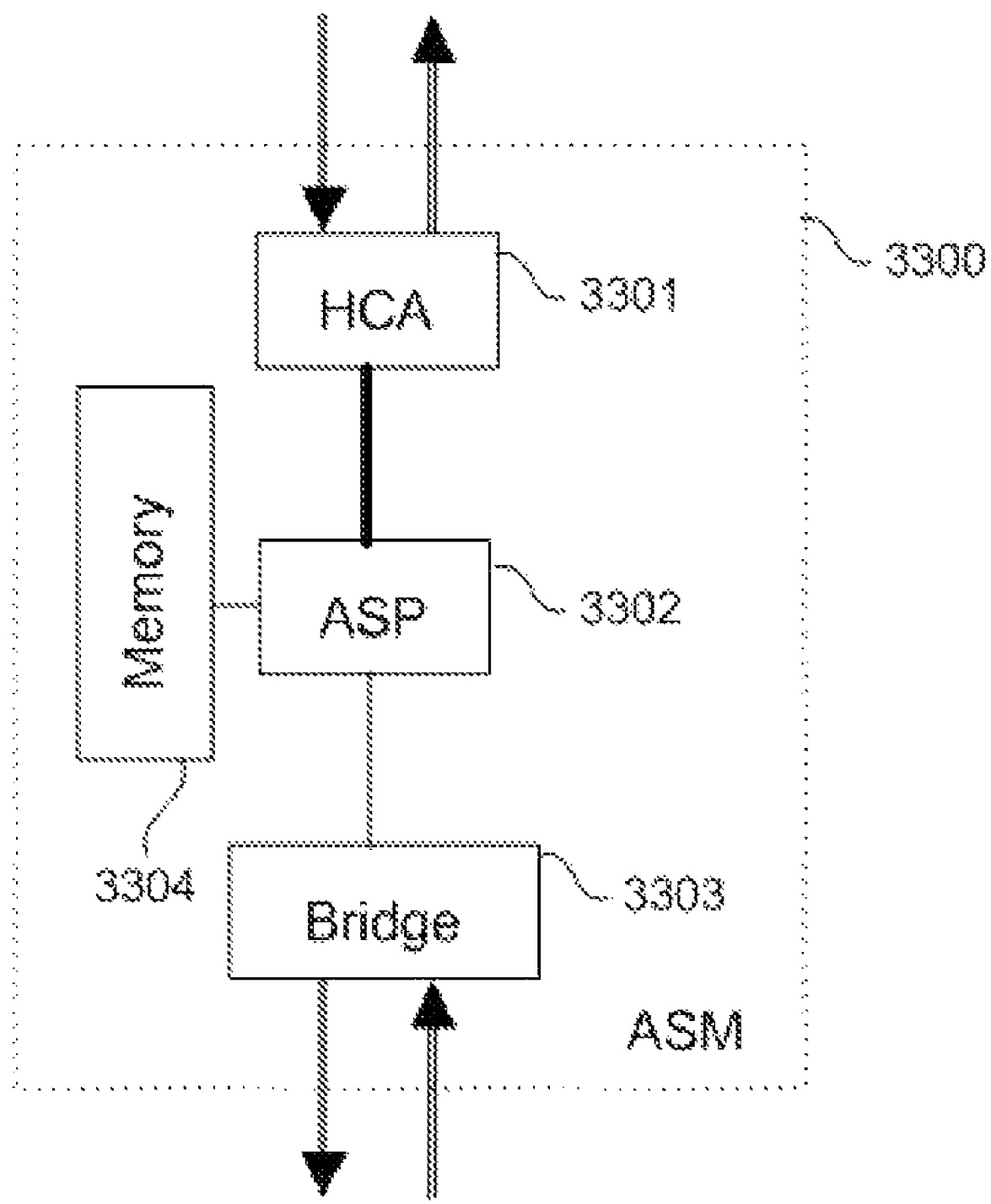
FIG. 10 is a block diagram of an Application Service Module (ASM) of an ANA according to one embodiment of the invention.

An ASM performs the ISO Layer-7 services, including application data processing on the data stream, which is the data stream of the transport protocol's PDU payload transformed by one or more NSMs. FIG. 10 illustrates how an ASM can be constructed in one embodiment of the invention. The ASM 3300 comprises a host channel adapter (HCA) 3301, an Application Service Processor (ASP) 3302, a bridge 3303 and memory 3304. The host channel adapter 3301 connects to the converged data center fabric which can be, for example, without limitation, LDTF or IB fabric. The bridge 3303 connects to the LDTF as a link to NSMs, for example. The ASP 3302 runs programs stored in memory 3304 to examine all ISO Layer-7 traffic and to perform ISO Layer-7 processing such as regular expression parsing, compression and decompression, standard and custom protocol proxy functions, etc.

Figure 11:
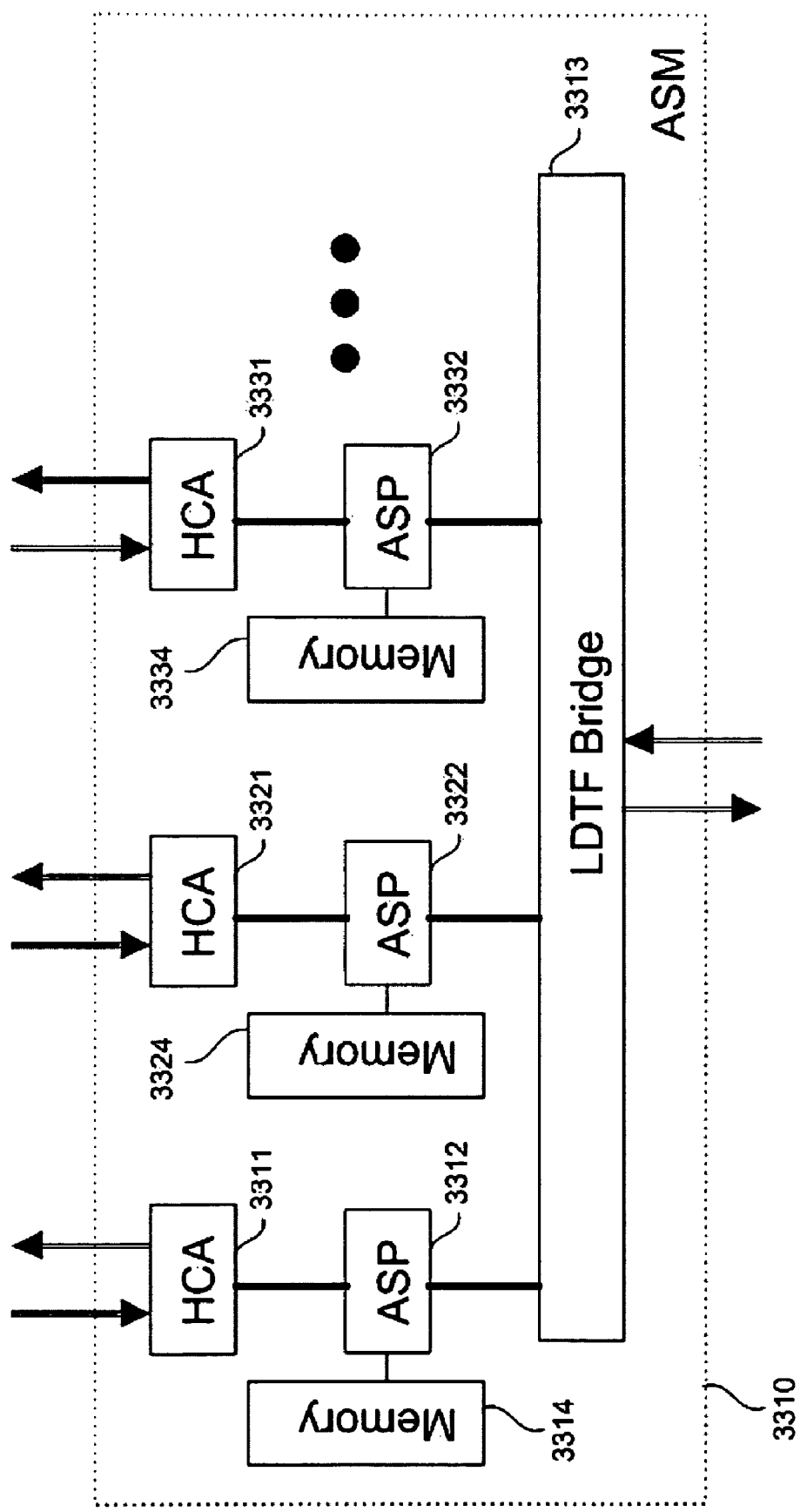
FIG. 11 is a block diagram of an ASM of an ANA according to another embodiment of the invention.

For those tasks a high compute power is needed, typically more than for plain ISO Layer-2 to ISO Layer-5 processing. Therefore, a single-processor architecture using existing micro-processors may require hardware assist to provide sufficient compute power for high-bandwidth client-to-server connections. Alternatively, it may be advantageous to implement an ASM either as a homogeneous multi-processor system of generic ISO Layer-7 processing units, or as a heterogeneous multi-processing system using a sea of different, specialized ISO Layer-7 processing units. FIG. 11 shows such a multi-processor architecture: Here the ASM 3310 can comprise two—or more—ASPs, such as ASP 3312, ASP 3322, ASP 3332, each having a dedicated host channel adapter, such as host channel adapter 3311, host channel adapter 3321, and host channel adapter 3331, and dedicated memory, such as memory 3314, memory 3324, and memory 3334. The LDTF bridge 3313 connects the ASPs via the LDTF to the NSMs, for example.

For building the multi-processor architecture of the ASM several options exist: A multi-core processor technology can be used, which can be a System-on-a-Chip with on-chip hardware accelerators; or one can use multi-core processors with external co-processors, for example, a co-processor for cryptographic operations, a co-processor for regular expression analysis, a co-processor for data compression and decompression, etc. A parallel-mode compute architecture can be deployed which will require a flow dispatcher to distribute incoming traffic across the multiple processors. A pipelined-mode compute architecture can be used, where one processing element acts as a pre-processor for a subsequent processing element. Or, a hybrid approach can be used combining parallel mode with pipelined compute architectures. Further, any other architecture contemplated by one of skill in the art may be used.

LDTF to Connect L2-L5 Unit with L7 Units

Figure 12:
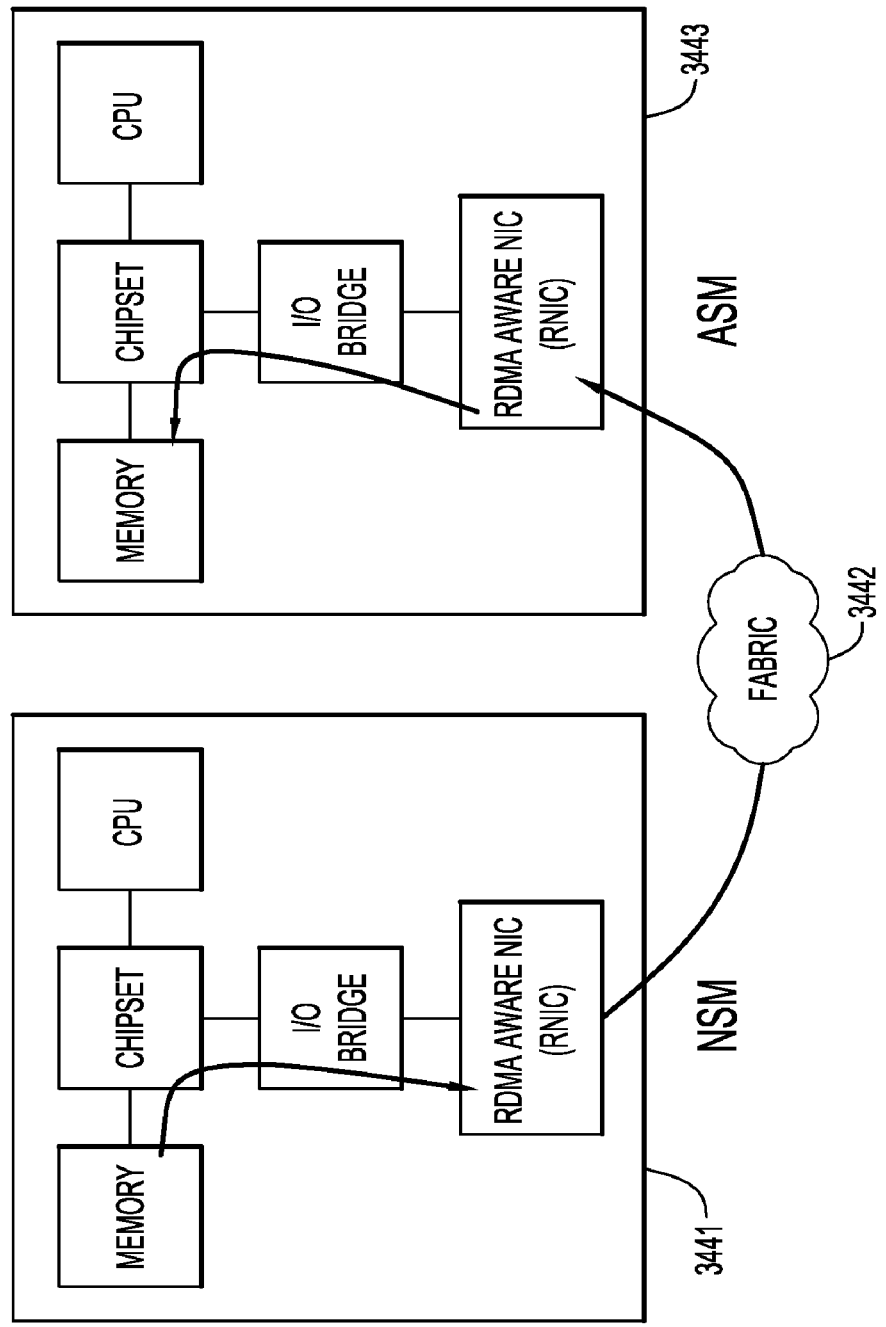
FIG. 12 is a block diagram which illustrates LDTF connectivity between a NSM and an ASM of an ANA according to one embodiment of the invention.

In any case, the compute architecture requires a lossless, low-latency, high-bandwidth fabric for any-to-any inter-process communication links between the one or more NSMs (which each may comprise one or more NSPs) and the one or more ASMs (which each may comprise one or more ASPs). FIG. 12 shows how in one embodiment of the invention, one ISO Layer-2 to ISO Layer-5 processing unit, NSM 3441, and one ISO Layer-7 processing unit, ASM 3443, can be connected via the LDTF 3442. Key to the connection is the use of an RDMA network interface connector (RNIC) which can be a host channel adapter for IB, for example, host channel adapter 2801, or host channel adapter 2811, or host channel adapter 2821, or host channel adapter 2831, or host channel adapter 3301, or host channel adapter 3311, or host channel adapter 3321, or host channel adapter 3331. Of course, two or more ISO Layer-2 to ISO Layer-5 processing units can be connected to two or more ISO Layer-7 processing units accordingly.

Many options exist for implementing the LDTF 3442: In one embodiment of the invention the LDTF can be IB. In another embodiment of the invention the LDTF can be Data Center Ethernet with RDMA support. In yet another embodiment of the invention, the LDTF can be iWARP which supports RDMA over TCP. Besides being a lossless, low-latency, high-bandwidth interconnect means RDMA enables the performance of RDMA one-sided read-based load monitoring and can be used to map connection level flow control using RDMA queue-pair flow control.

Scalability

Various embodiments of some of the inventions for scalability have been described in this disclosure, for example, the embodiment of the invention can not only be used for high-availability but also to scale an ANA for higher bandwidth and network processing demands. When two or more NSMs or two or more ASMs are connected via LDTF within one ANA, the inter-process communication between NSMs and ASMs then operates via so-called intra-chassis communication. Alternatively, when two or more ANAs are connected via LDTF, the inter-process communication then operates via so-called inter-chassis communication. Or, when both approaches are combined, both intra-chassis and inter-chassis communication goes over the LDTF.

Figure 13:
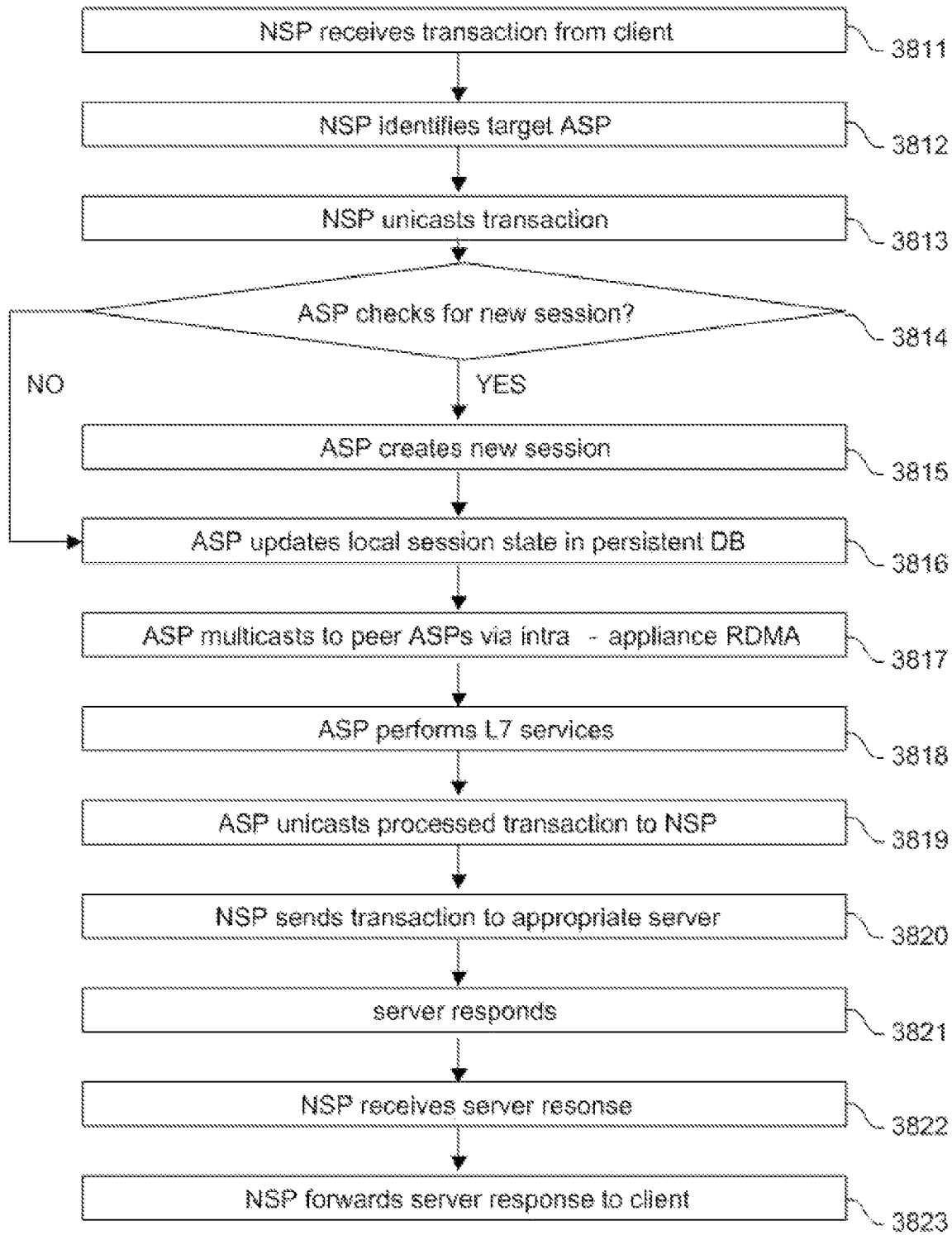
FIG. 13 is a flow diagram of inter-process communication in an ANA according to one embodiment of the invention.

FIG. 13 shows a method for intra-chassis communication between one or more NSMs and one or more ASMs when an application server is connected via classical Ethernet. In step 3811 an NSP receives a transaction from a client. In step 3812 the NSP identifies the target ASP. In step 3813 the NSP uni-casts the transaction to the ASP identified in step 3812. In step 3814 the ASP checks whether this transaction is part of a new session. If the result of this check is positive (YES), the ASP creates a new session in step 3815 and proceeds to step 3816. Otherwise (NO), the method proceeds to step 3816 immediately. In step 3816 the ASP updates the local session state in the persistent database. In step 3817 the ASP multi-casts the database information for the updated local session state to the peer ASPs via an intra-chassis RDMA operation. This step is part of achieving high-availability with zero-click fail-over. In step 3818 the ASP performs the ISO Layer-7 services, for example, based on policies. In step 3819 the ASP uni-casts the transaction, which is now processed, back to the NSP. In step 3820 the NSP sends the ISO Layer-7 processed transaction to the appropriate application server. In step 3821 the application server responds and in step 3822 the NSP receives the application server's response. In the last step 3823, the NSP then forwards the application server's response back to the client.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A network device comprising:
a switch fabric;
a first service module coupled to the switch fabric;
a second service module coupled to the first service module over the switch fabric; and
a third service module coupled to the first service module and the second service module over the switch fabric,
wherein in response to packets of a network transaction received from a client device over a first network to access a server of a data center having a plurality of servers over a second network, the first service module is configured to terminate a transport control protocol (TCP) connection of the packets, wherein the TCP terminated packets are transmitted to the second and third service modules over the switch fabric, wherein the second service module is configured to perform first application network services on the TCP terminated packets without having to perform a TCP process on the packets, and wherein the third service module is configured to perform second application network services different from the first application network services on the TCP terminated packets without having to perform a TCP process on the packets.

2. The network device of claim 1, wherein the switch fabric is a lossless switch fabric is implemented as one of a remote direct memory access (RDMA) compatible fabric, an Infini-Band compatible fabric, and an Internet Wide Area RDMA Protocol (iWARP) compatible fabric.

3. The network device of claim 1, wherein the network device is configured operate as an application services gateway to the data center between the client device and a server of the data center.

4. The network device of claim 1, wherein the application network services performed by the second and third service modules comprise at least layer-5 to layer-7 (layer 5-7) processes on the packets of the network transaction.

5. The network device of claim 4, wherein the second and third service modules are configured to perform the layer 5-7 processes on the packets in a pipeline manner.

6. The network device of claim 1, wherein the first service module is configured to generate a data stream based on the packets after terminating the TCP connection, and to transmit the data stream to the second and third service modules over the switch fabric without the second and third service modules having to perform TCP processes.

7. The network device of claim 6, wherein the first service module is configured to transmit the data stream to the second service module to perform the first application network services and thereafter, the second service module is configured to transmit at least a portion of the data stream to the third service module to enable the third service module to perform the second application network services without performing further TCP processes, and wherein the third service module is configured to transmit the data stream back to the second service module that is configured to transmit the data stream to the first service module after performing further first application services on the data stream.

8. The network element of claim 7, wherein the first application network services performed by the second service module and the second application network services performed by the third service module are different types of application network services that are associated with the network transaction.

9. The network device of claim 1, wherein the first service module is implemented in a first plane, and wherein the second service module and the third service module are implemented in a plane other than the first plane and coupled to the first plane via a backplane.

10. The network device of claim 9, wherein the second and third service modules are implemented either on a same plane or on different planes.

11. A method comprising:
at a network device, receiving packets of a network transaction from a client device over a first network for accessing a server of a data center having a plurality of servers over a second network, the network device including a plurality of service modules coupled to each other over a switch fabric;
at a first service module of the plurality of service modules of the network device, terminating a TCP (transport control protocol) connection of the packets;
at the first service module, generating a data stream representing a TCP terminated packets;
at the first service module, transmitting the data stream to a second service module of the plurality of service modules and to a third service module of the plurality of service modules over the switch fabric for further processes;
at the second service module, performing first application network services on the TCP terminated packets without having to perform a TCP process on the packets; and
at the third service module, performing second application network services different from the first application network services on the TCP terminated packets without having to perform TCP termination related processes.

12. The method of claim 11, wherein receiving comprises receiving packets over the switch fabric that is a lossless switch fabric which is implemented as one of a remote direct memory access (RDMA) compatible fabric, an InfiniBand compatible fabric, and an Internet Wide Area RDMA Protocol (iWARP) compatible fabric.

13. The method of claim 11, wherein receiving comprises receiving the packets such that the network device operates as an application services gateway to the data center between the client device and a server of the data center.

14. The method of claim 11, wherein performing the first application network services on the packets and performing the second application network services on the packets comprises performing at least layer-5 to layer-7 (layer 5-7) processes on the packets of the network transaction at the second and third service modules.

15. The method of claim 14, wherein performing the first application network services on the packets and performing the second application network services on the packets comprises performing the layer 5-7 processes on the packets in a pipeline manner.

16. The method of claim 11, further comprising:
executing operations of the first service module in a first plane;
executing operations of the second and third service modules in a plane other than the first plane; and
coupling the first plane and the plane other than the first plane via a backplane.

17. The method of claim 16, wherein executing operations of the second and third service module comprises executing operations of the second and third service modules on either a same plane or on different planes.

18. A machine-readable storage medium having instructions stored therein, which when executed by a machine, cause the machine to:
receive at a network device packets of a network transaction from a client device over a first network for accessing a server of a data center having a plurality of servers over a second network, the network device including a plurality of service modules coupled to each other over a switch fabric;
terminate a TCP (transport control protocol) connection of the packets at a first service module of the plurality of service modules;
generate a data stream representing a TCP terminated packets; and
transmit the data stream to a second service module of the plurality of service modules and to a third service module of the plurality of service modules over the switch fabric for further processes;
perform first application network services on the TCP terminated packets without having to perform a TCP process on the packets; and
perform second application network services different from the first application network services on the TCP terminated packets without having to TCP termination related processes.

19. The machine-readable storage medium of claim 18, wherein the instructions that cause the processor to receive packets comprise instructions that cause the processor to receive packets over the switch fabric that is a lossless switch fabric which is implemented as one of a remote direct memory access (RDMA) compatible fabric, an InfiniBand compatible fabric, and an Internet Wide Area RDMA Protocol (iWARP) compatible fabric.

20. The machine-readable storage medium of claim 18, wherein the instructions that cause the processor to receive the packets comprise instructions that cause the processor to receive the packets such that the network device operates as an application services gateway to the data center between the client device and a server of the data center.

21. The machine-readable storage medium of claim 18, wherein the instructions that cause the processor to perform the first application network services and the second application network services comprise instructions that cause the processor to perform at least layer-5 to layer-7 (layer 5-7) processes on the packets of the network transaction at the second and third service modules.

22. The machine-readable storage medium of claim 21, wherein the instructions that cause the processor to perform the first application network services on the packets and to perform the second application network services on the packets comprise instructions that cause the processor to perform the layer 5-7 processes on the packets in a pipeline manner.

23. The machine-readable medium of claim 18, further comprising instructions that cause the processor to:
execute operations of the first service module in a first plane;
execute operations of the second and third service modules in a plane other than the first plane that is coupled to the first plane via a backplane.

24. The machine-readable storage medium of claim 23, wherein the instructions that cause the processor to execute operations of the second and third service module comprise instructions that cause the processor to execute operations of the second and third service modules on either a same plane or on different planes.

* * * * *